(12) United States Patent
Ootaki

(10) Patent No.: US 11,115,128 B2
(45) Date of Patent: Sep. 7, 2021

(54) OPTICAL TRANSMISSION DEVICE, TRANSMISSION SYSTEM, AND CONTROL METHOD FOR TRANSMISSION SYSTEM

(71) Applicant: NEC Corporation, Tokyo (JP)

(72) Inventor: Kazuhiro Ootaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/964,716

(22) PCT Filed: Jan. 23, 2019

(86) PCT No.: PCT/JP2019/001988
§ 371 (c)(1),
(2) Date: Jul. 24, 2020

(87) PCT Pub. No.: WO2019/151067
PCT Pub. Date: Aug. 8, 2019

(65) Prior Publication Data
US 2020/0358534 A1 Nov. 12, 2020

(30) Foreign Application Priority Data
Jan. 31, 2018 (JP) .............................. JP2018-014326

(51) Int. Cl.
*H04J 14/02* (2006.01)
*H04B 10/572* (2013.01)

(52) U.S. Cl.
CPC .......... *H04B 10/572* (2013.01); *H04J 14/021* (2013.01)

(58) Field of Classification Search
CPC ... H04B 10/572; H04B 10/564; H04J 14/021; H04J 14/0221
See application file for complete search history.

(56) References Cited

U.S. PATENT DOCUMENTS

2001/0048539 A1* 12/2001 Kubo ................. H04B 10/2525
398/147
2003/0048508 A1* 3/2003 Yu ........................ H04B 10/506
398/91
(Continued)

FOREIGN PATENT DOCUMENTS

EP      1503533 A2   2/2005
EP      2784961 A2   10/2014
(Continued)

OTHER PUBLICATIONS

International Search Report corresponding to PCT/JP2019/001988 dated Mar. 12, 2019 (2 pages).
(Continued)

*Primary Examiner* — Dzung D Tran

(57) ABSTRACT

The present invention provides an optical transmission device, a transmission system, and a control method for a transmission system which make it possible to adjust the wavelength band of dummy light according to the wavelength band of an added main signal. This optical transmission device comprises: an output branching unit which multiplexes and outputs an added main signal and dummy light; a wavelength adjustment unit which adjusts the wavelength band of the dummy light; a signal detection unit to which an optical signal outputted by the output branching unit is inputted, and which detects the wavelength band of the added main signal and outputs a detection result; and a control unit which controls the wavelength adjustment unit according to the detection result from the signal detection unit.

10 Claims, 17 Drawing Sheets

(56) References Cited

U.S. PATENT DOCUMENTS

| | | | |
|---|---|---|---|
| 2005/0024715 A1* | 2/2005 | Inoue | H04J 14/0221 |
| | | | 359/337 |
| 2008/0304829 A1 | 12/2008 | Sato | |
| 2014/0286635 A1* | 9/2014 | Kaneko | H04B 10/564 |
| | | | 398/34 |
| 2017/0359141 A1 | 12/2017 | Boertjes et al. | |
| 2018/0034544 A1 | 2/2018 | Satou | |
| 2018/0351640 A1 | 12/2018 | Satou | |

FOREIGN PATENT DOCUMENTS

| | | |
|---|---|---|
| EP | 3267598 A1 | 1/2018 |
| EP | 3273626 A1 | 1/2018 |
| JP | 2003-244080 A | 8/2003 |
| JP | 2005-051598 A | 2/2005 |
| JP | 2006-5639 A | 1/2006 |
| JP | 2014-187671 A | 10/2014 |
| WO | WO-2015/045311 A1 | 4/2015 |
| WO | WO-2016/139933 A1 | 9/2016 |

OTHER PUBLICATIONS

Written Opinion ISA 237 corresponding to PCT/JP2019/001988 dated Mar. 12, 2019 (7 pages).
Extended European Search Report for EP Application No. EP19747753.2 dated on Mar. 1, 2021.

* cited by examiner

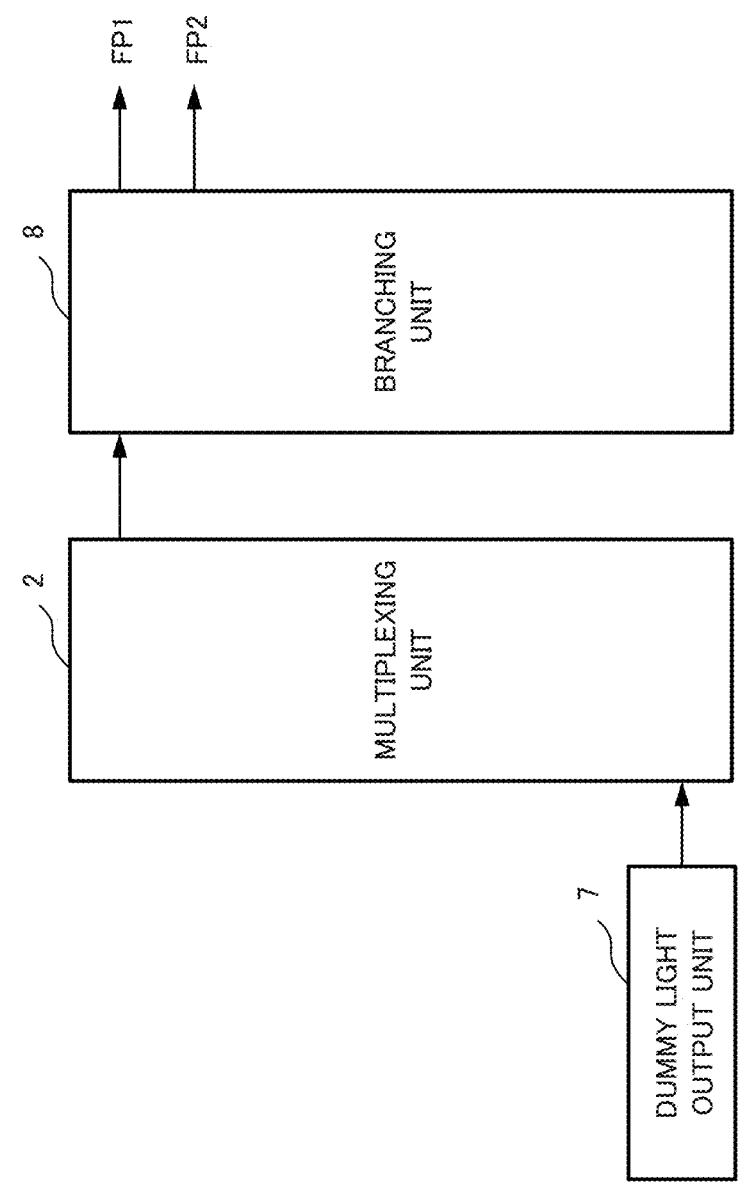

OPTICAL TRANSMISSION DEVICE, TRANSMISSION SYSTEM, AND CONTROL METHOD FOR TRANSMISSION SYSTEM

CROSS REFERENCE TO RELATED APPLICATIONS

This application is a national stage application of International Application No. PCT/JP2019/001988 entitled "Optical Transmission Device, Transmission System, and Control Method for Transmission System" filed on Jan. 23, 2019, which claims priority to Japanese Patent Application No. JP2018-014326 filed on Jan. 31, 2018, the disclosures of which are hereby incorporated by reference in their entirety.

TECHNICAL FIELD

The present invention relates to an optical transmission device, a transmission system, and a control method for a transmission system, and in particular to compensation of an optical signal to be transmitted through an optical fiber.

BACKGROUND ART

In an optical submarine cable system, as traffic increases, it is required to widen a bandwidth of a line and enhance functionality of a network. Thus, technologies such as an optical add-drop multiplexer (OADM) and a reconfigurable optical add-drop multiplexer (ROADM) are applied to the optical submarine cable system.

In the optical submarine cable system to which the ROADM technology is applied, a wavelength division multiplexing (WDM) communication is used. An optical transmission device inputs, as a wavelength multiplexed optical signal, a client signal to a submarine cable, and accommodates a plurality of paths in one optical fiber, thereby improving flexibility of a network.

The optical submarine cable system is controlled in such a way that total power of a signal to be transmitted through a cable constituted of the optical fiber is constant. For example, when a part of a wavelength component of the signal to be transmitted is lost due to disconnection of the optical submarine cable or the like, it can be considered to compensate for power of the lost signal by amplifying the other wavelength component of the signal. However, when power of a specific wavelength component of the signal is increased, an optical spectrum changes due to a nonlinear effect of the optical fiber, and thus transmission line quality of the signal deteriorates. Therefore, the submarine cable system uses a function that compensates for lost signal intensity with dummy light.

For example, Patent Literature 1 (PTL1) proposes, in an optical transmission device of a landing station, generating dummy light depending on power fluctuation of a main signal to be transmitted by a transmission unit. In PTL1, the main signal to be transmitted by the transmission unit and the dummy light are multiplexed in a multiplexing unit and then output to an opposite terminal station.

Patent Literature 2 (PTL2) is related to a monitoring test method for a dark fiber, and proposes that a facility rental company of the dark fiber monitors an optical transmission characteristic of the dark fiber and notifies a user of a rented dark fiber.

CITATION LIST

Patent Literature

[PTL1] International Publication No. WO2015/045311
[PTL2] Japanese Patent Application Laid-Open No. 2003-244080

SUMMARY OF INVENTION

Technical Problem

An optical transmission device includes a transmission unit that outputs a main signal and a multiplexing unit that multiplexes and outputs the main signal to be output by the transmission unit. Herein, it is assumed that vendors that manufacture the transmission unit and the multiplexing unit that constitute a transmission device are different. A transmitter that transmits the main signal may also be manufactured by various vendors and configured according to various standards.

When the transmission device is manufactured by a single vendor, it is possible to set, at a time of system design, a wavelength band of the main signal including an additional component after operation including the transmission unit and the multiplexing unit, and thus dummy light is provided in a wavelength band different from the wavelength band of the main signal. However, when the transmitter is manufactured by various vendors, it is assumed that the main signal is added in a wavelength band that is not set at the start of operation. It is also assumed that the wavelength of the main signal to be added is actually different from a wavelength designed by the system. At this time, a problem of overlapping of the wavelength bands between the main signal and the dummy light may occur.

Therefore, it is necessary to adjust the wavelength band of the dummy light according to the wavelength band of the main signal to be added, however, PTL1 does not describe a technique for achieving the adjustment.

An object of the present invention is to provide an optical transmission device, a transmission system, and a control method for a transmission system that can adjust a wavelength band of dummy light according to a wavelength band of a main signal to be added.

Solution to Problem

In order to achieve the above-described object, an optical transmission device according to the present invention includes:

an output branching unit that multiplexes and outputs an added main signal and dummy light;

a wavelength adjustment unit that adjusts a wavelength band of the dummy light;

a signal detection unit that inputs an optical signal to be output by the output branching unit, detects a wavelength band of an added main signal, and outputs a detection result; and a control unit that controls the wavelength adjustment unit according to a detection result of the signal detection unit.

A transmission system according to the present invention includes an optical transmission device connected via an optical fiber, wherein the optical transmission device includes:

an output branching unit that multiplexes and outputs an added main signal and dummy light;

a wavelength adjustment unit that adjusts a wavelength band of the dummy light;

a signal detection unit that inputs an optical signal to be output by the output branching unit, detects a wavelength band of an added main signal, and outputs a detection result; and a control unit that controls the wavelength adjustment unit according to a detection result of the signal detection unit.

A control method for a transmission system according to the present invention is a control method for a transmission system to which an optical transmission device is connected via an optical fiber, and includes:

multiplexing and outputting a main signal from a transmitter and dummy light to be input;

measuring optical signal intensity of each wavelength of a multiplexed output of a main signal from the transmitter and dummy light to be input, and outputting a detection result; and adjusting a wavelength band of a signal of the multiplexed output according to the detection result.

Advantageous Effects of Invention

The present invention is able to provide the optical transmission device, the transmission system, and the control method for the transmission system that can adjust the wavelength band of the dummy light according to the wavelength band of the main signal to be added.

BRIEF DESCRIPTION OF DRAWINGS

FIG. 11B is a block diagram of the optical transmission device according to the fourth example embodiment that illustrates a redundant configuration in the state where only dummy light is being transmitted.

FIG. 14 is a flowchart illustrating the ON/OFF control of the dummy light and the like.

EXAMPLE EMBODIMENT

A preferred example embodiment of the present invention is described in detail with reference to the drawings.

First Example Embodiment

Figure 1:
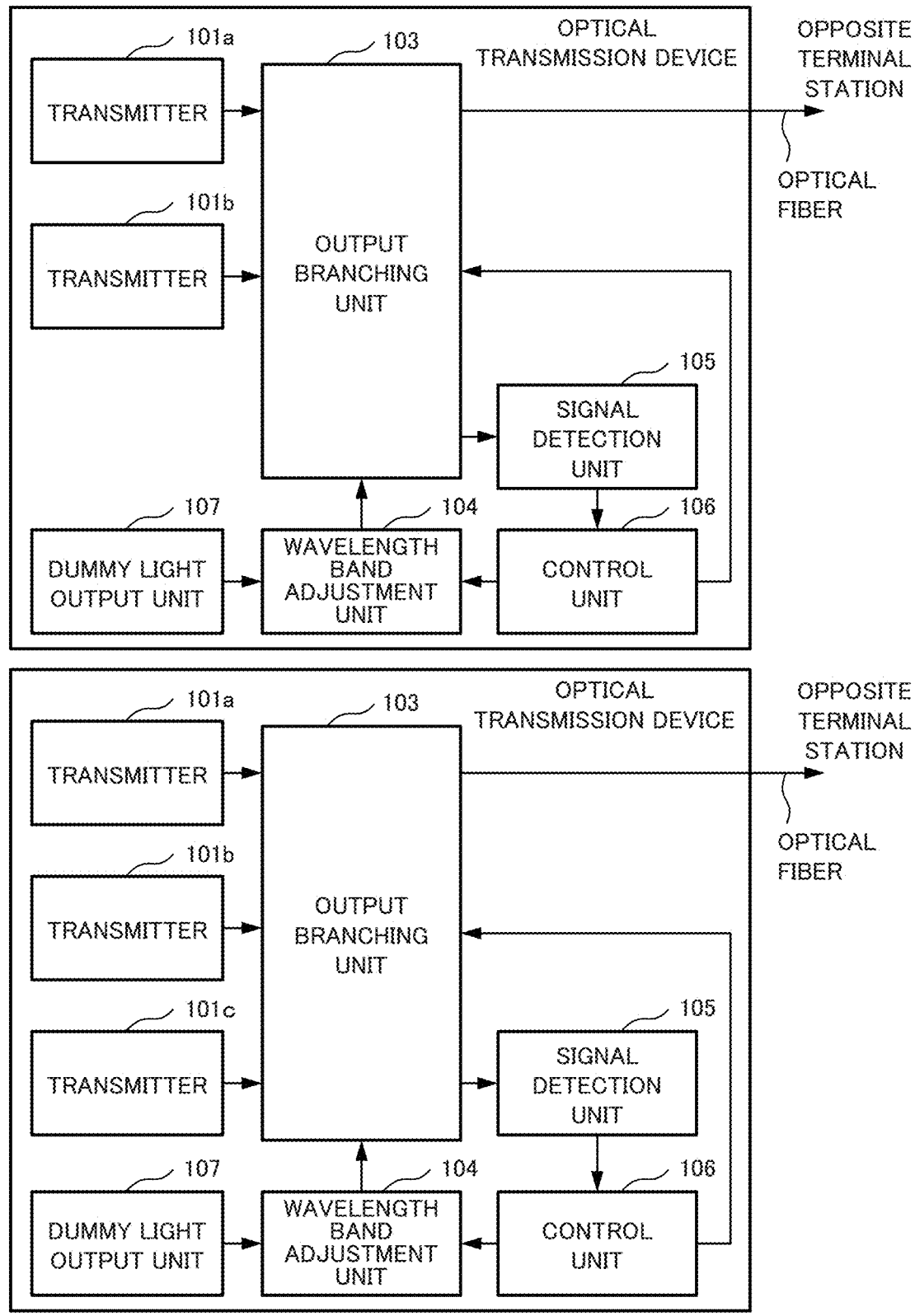
FIG. 1 An upper diagram and a lower diagram in FIG. 1 are block diagrams of an optical transmission device according to a first example embodiment.

An upper diagram and a lower diagram in FIG. 1 are block diagrams of an optical transmission device according to a first example embodiment. The optical transmission device in the upper diagram of FIG. 1 includes a plurality of transmitters 101a and 101b, a signal detection unit 105, a control unit 106, and a dummy light output unit 107. The optical transmission device in the lower diagram of FIG. 1 illustrates a state in which a transmitter 101c is added to the optical transmission device in the upper diagram of FIG. 1.

The optical transmission device in the upper diagram of FIG. 1 is installed in a landing station. The optical transmission device in the upper diagram of FIG. 1 outputs an optical signal to an optical transmission device in an opposing terminal station via an optical fiber in a submarine cable. The plurality of transmitters 101a and 101b are transponders. The dummy light output unit 107 outputs dummy light. The dummy light output unit 107 includes a light source that outputs amplified spontaneous emission (ASE) light.

The optical transmission device in the upper diagram of FIG. 1 includes an output branching unit 103, and a wavelength band adjustment unit 104 as one example of a wavelength adjustment unit. The output branching unit 103 and the wavelength band adjustment unit 104 of the optical transmission device in the upper diagram of FIG. 1 may be constituted of wavelength multiplexing equipment (WME), for example.

The output branching unit 103 can output a main signal to be input and dummy light to the optical fiber and the signal detection unit 105. Herein, the output branching unit 103 may be constituted of, for example, an optical coupler. The output branching unit 103 may also be constituted of a wavelength selective switch.

The wavelength band adjustment unit 104 adjusts a wavelength band of the dummy light. The wavelength band adjustment unit 104 may be constituted of, for example, a tunable optical filter. The wavelength band adjustment unit 104 may be provided integrally with the dummy light output unit 107.

The output branching unit 103 and the wavelength band adjustment unit 104 may be integrated and constituted of a wavelength selective switch (WSS).

The signal detection unit 105 can measure a wavelength band of the optical signal of each wavelength from the output branching unit 103. Further, the signal detection unit 105 may be capable of measuring a center wavelength, intensity, and the like of the optical signal of each wavelength. The signal detection unit 105 may be constituted of an optical channel monitor (OCM).

The control unit 106 controls the wavelength band adjustment unit 104 and the output branching unit 103. The control unit 106 controls the wavelength band adjustment unit 104 and the output branching unit 103, based on an output of the signal detection unit 105. When the wavelength band adjustment unit 104 and the output branching unit 103 are configured as the WSS, the control unit 106 may be provided within the WSS.

<Operation>

Figure 2:
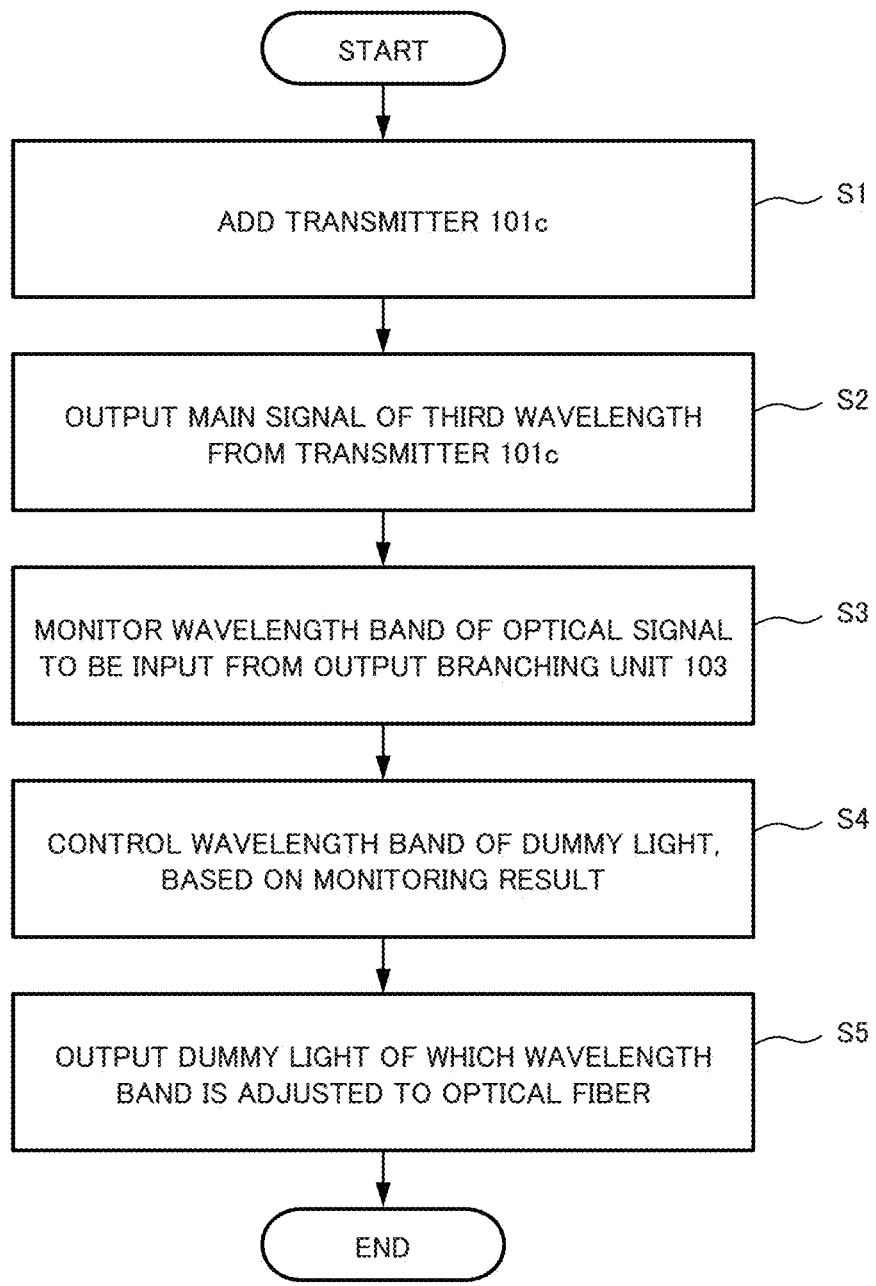
FIG. 2 is a flowchart illustrating an operation of the optical transmission device when a transmitter 101c is added.
Figure 3:
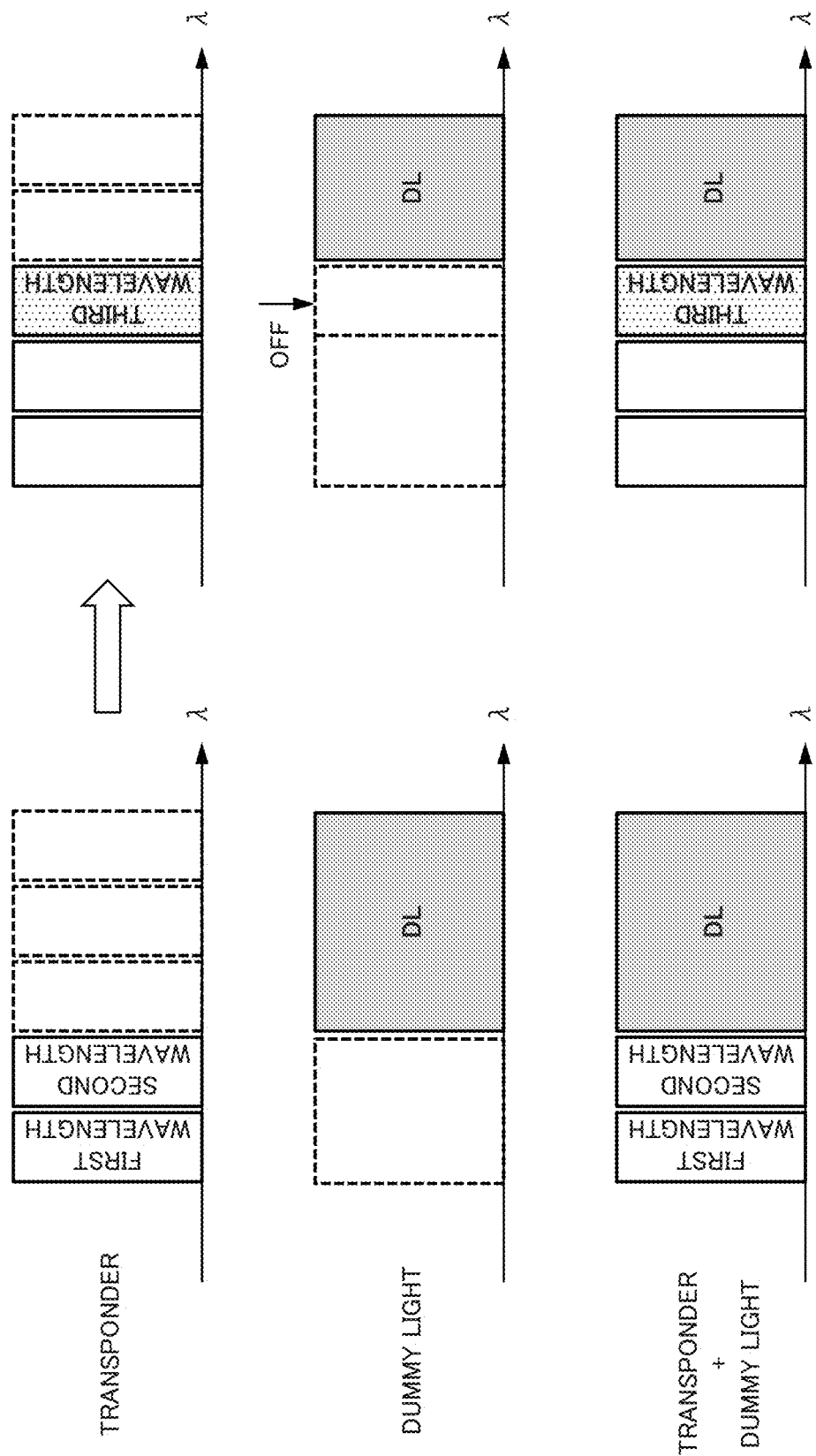
FIG. 3 is a conceptual diagram illustrating ON/OFF control of dummy light when the transmitter 101c is added to the optical transmission device in the upper diagram of FIG. 1.

Among the operations of the optical transmission device in the upper diagram of FIG. 1, an operation related to wavelength band control of the dummy light, particularly, when the transmitter 101c is added as the optical transmission device illustrated in the lower diagram of FIG. 1 will be described. FIG. 2 is a flowchart illustrating the operation of the optical transmission device when the transmitter 101c is added. FIG. 3 is a conceptual diagram illustrating ON/OFF control of the dummy light when the transmitter 101c is added to the optical transmission device in the upper diagram of FIG. 1.

It is assumed that the existing transmitter 101c outputs a signal of a first wavelength, the existing transmitter 101b outputs a signal of a second wavelength, and the added transmitter 101c outputs a signal of a third wavelength.

First, the transmitter 101c is added to the optical transmission device in the upper diagram of FIG. 1 (step S1). Then, a main signal having the third wavelength is output from the added transmitter 101c (step S2). The output branching unit 103 outputs, to the signal detection unit 105, the signal of the third wavelength to be input. Further, the output branching unit 103 outputs, to the signal detection unit 105, main signals from the existing transmitters 101a and 101b and dummy light. When the output branching unit 103 is provided as the WSS, the output branching unit 103 may block the output of the signal of the third wavelength to an optical fiber.

Next, the signal detection unit 105 monitors a wavelength band of the optical signal to be input from the output branching unit 103 (step S3), and notifies the control unit 106 of a monitoring result.

Next, the control unit 106 controls a wavelength band of the dummy light, based on the monitoring result from the signal detection unit 105 (step S4). More specifically, the control unit 106 identifies the wavelength band of the signal of the added third wavelength, based on the monitoring result from the signal detection unit 105. The control unit 106 instructs the wavelength band adjustment unit 104 to control the wavelength band of the dummy light. For example, the control unit 106 controls the wavelength band adjustment unit 104 in such a way as to block a wavelength band that overlaps with the wavelength band of the signal of the third wavelength among the wavelength bands of the dummy light.

The output branching unit 103 outputs, to the optical fiber, the existing main signal, the optical signal of the added wavelength, and the dummy light of which a wavelength band is adjusted (step S5). When the output branching unit 103 is constituted of the wavelength selective switch, the control unit 106 may instruct the output branching unit 103 to output the optical signal of the added wavelength to the optical fiber, in response to the wavelength band adjustment unit 104 controlling the wavelength band of the dummy light.

By such an operation, among the wavelength bands of the dummy light illustrated in FIG. 3, a band overlapping with the band of the third wavelength to be output by the added transmitter 101c is set to OFF, and the third wavelength is assigned to the added transmitter 101c and output to the optical fiber.

Advantageous Effects

According to the optical transmission device in FIG. 1, the wavelength band of the dummy light can be adjustable according to the wavelength of the main signal of the transmitter to be added.

Further, in the optical transmission device of FIG. 1, the wavelength band of the dummy light is adjusted according to the monitoring result of the signal detection unit 105. This enables in-service wavelength addition without blocking a communication of the existing main signal.

Further, the optical transmission device in FIG. 1 controls the wavelength of the dummy light with the addition of the main signal, and thus complicated control is not required for the transmitter 101c to be added. As a result, the optical transmission device in FIG. 1 can flexibly respond to a transmitter different in manufacturing vendors and standards.

Second Example Embodiment

Figure 4:
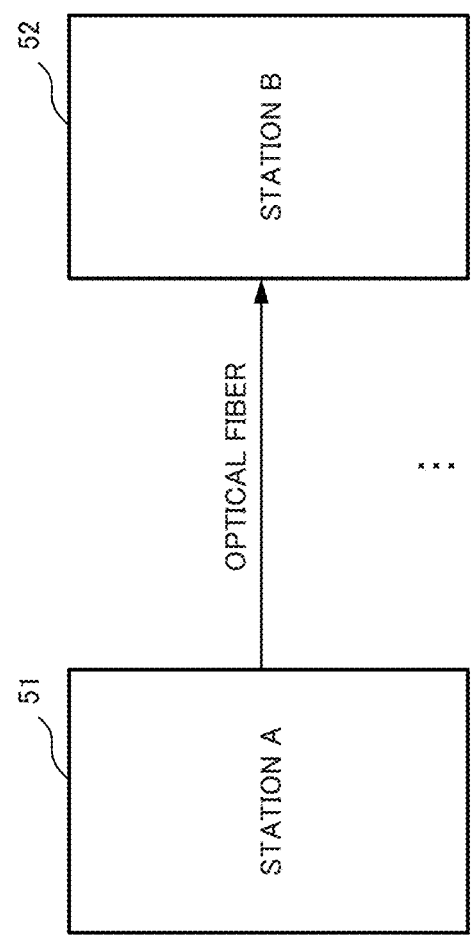
FIG. 4 is a block diagram illustrating one example of a transmission system.

FIG. 4 is a block diagram illustrating one example of a transmission system. A submarine cable system will be described as the transmission system. In the transmission system of FIG. 4, an optical transmission device 51 (station A) and an optical transmission device 52 (station B) are connected by a laid optical fiber.

Figure 5:
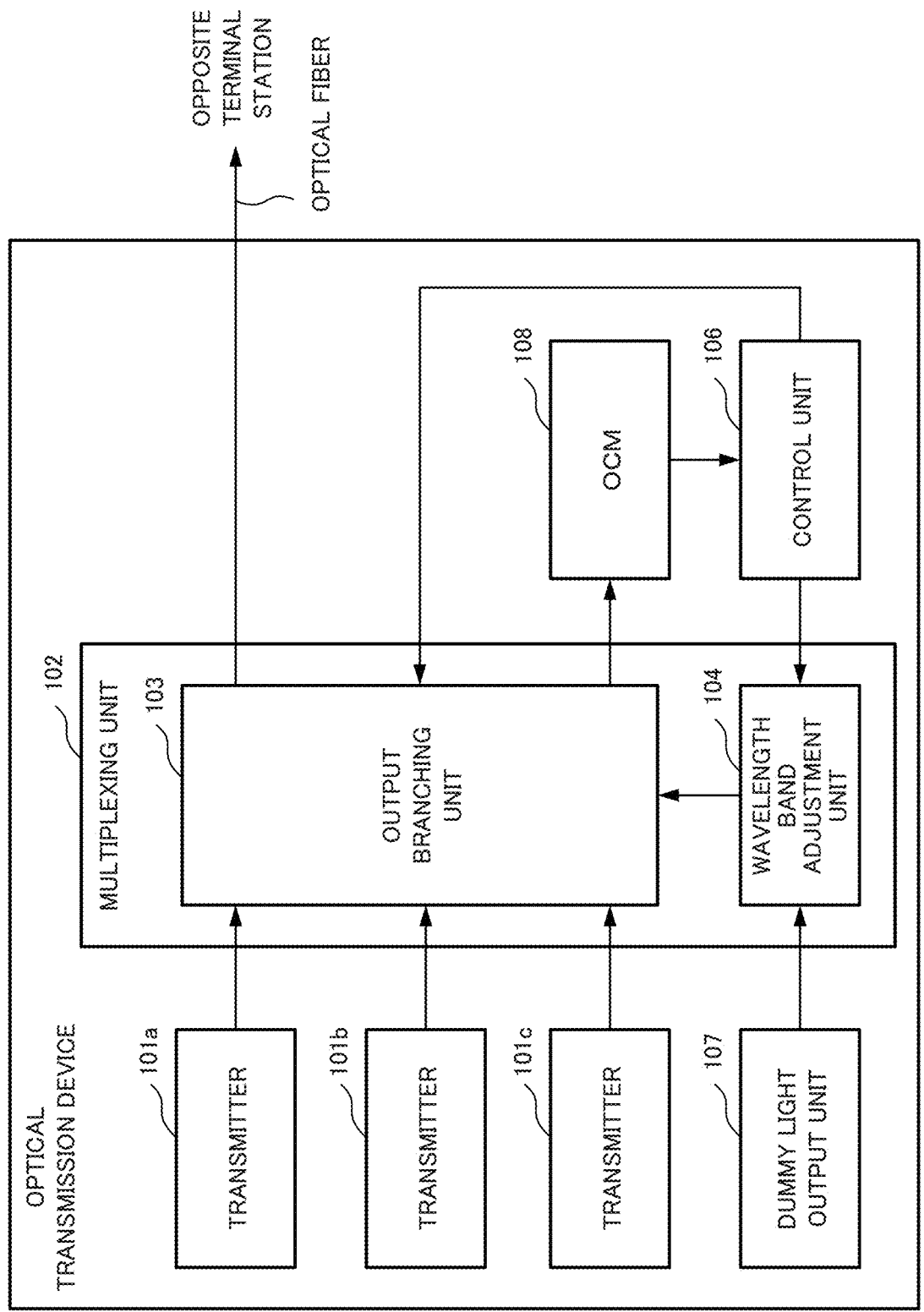
FIG. 5 is a block diagram of an optical transmission device according to a second example embodiment.

FIG. 5 is a block diagram of an optical transmission device according to a second example embodiment. The optical transmission device in FIG. 5 includes a plurality of transmitters 101a and 101b, a multiplexing unit 102, an optical channel monitor (OCM) 108 as one example of a signal detection unit, a control unit 106, and a dummy light output unit 107. The optical transmission device in FIG. 5 illustrates a state in which a transmitter 101c is added.

The optical transmission device in FIG. 5 is provided in a landing station, similarly to the optical transmission device according to the first example embodiment. The optical transmission device in FIG. 5 outputs an optical signal to an optical transmission device in an opposing terminal station via an optical fiber in a submarine cable. The plurality of transmitters 101a and 101b are transponders. The dummy light output unit 107 outputs dummy light. The dummy light output unit 107 includes a light source that outputs amplified spontaneous emission (ASE) light.

The multiplexing unit 102 includes an output branching unit 103, and a wavelength band adjustment unit 104 as one example of a wavelength adjustment unit. The multiplexing unit 102 is constituted of wavelength multiplexing equipment (WME), for example.

The output branching unit 103 in the multiplexing unit 102 can output a main signal to be input and dummy light to the optical fiber and the OCM 108. Herein, the output branching unit 103 may be constituted of an optical coupler. Further, the output branching unit 103 in the multiplexing unit 102 may be constituted of a wavelength selective switch capable of switching, in a wavelength unit, an output destination of the optical signal to be input.

The wavelength band adjustment unit 104 in the multiplexing unit 102 adjusts a wavelength band of the dummy light. The wavelength band adjustment unit 104 in the multiplexing unit 102 is constituted of, for example, a tunable optical filter.

The OCM 108 measures optical signal intensity of each wavelength from the output branching unit 103 in the multiplexing unit 102.

The control unit 106 controls the wavelength band adjustment unit 104 and the output branching unit 103 included in the multiplexing unit 102. The control unit 106 controls the wavelength band adjustment unit 104 and the output branching unit 103 in the multiplexing unit 102, based on an output of the OCM 108. When the multiplexing unit 102 is configured as the WSS, the control unit 106 may be provided within the WSS.

According to the present example embodiment, the control unit 106 performs power control of the dummy light according to a monitoring result from the OCM 108. In other words, according to the present example embodiment, the power control of the dummy light is performed according to a power monitoring result of the OCM 108 included in an optical transmission device on a transmission side.

Note that the power control of the dummy light according to the monitoring result of the OCM 108 may be performed according to a monitoring result of an OCM provided on a reception side. A reference value may be set during the power control, regardless of using the OCM on the transmission side or on the reception side.

<Operation>

Figure 6:
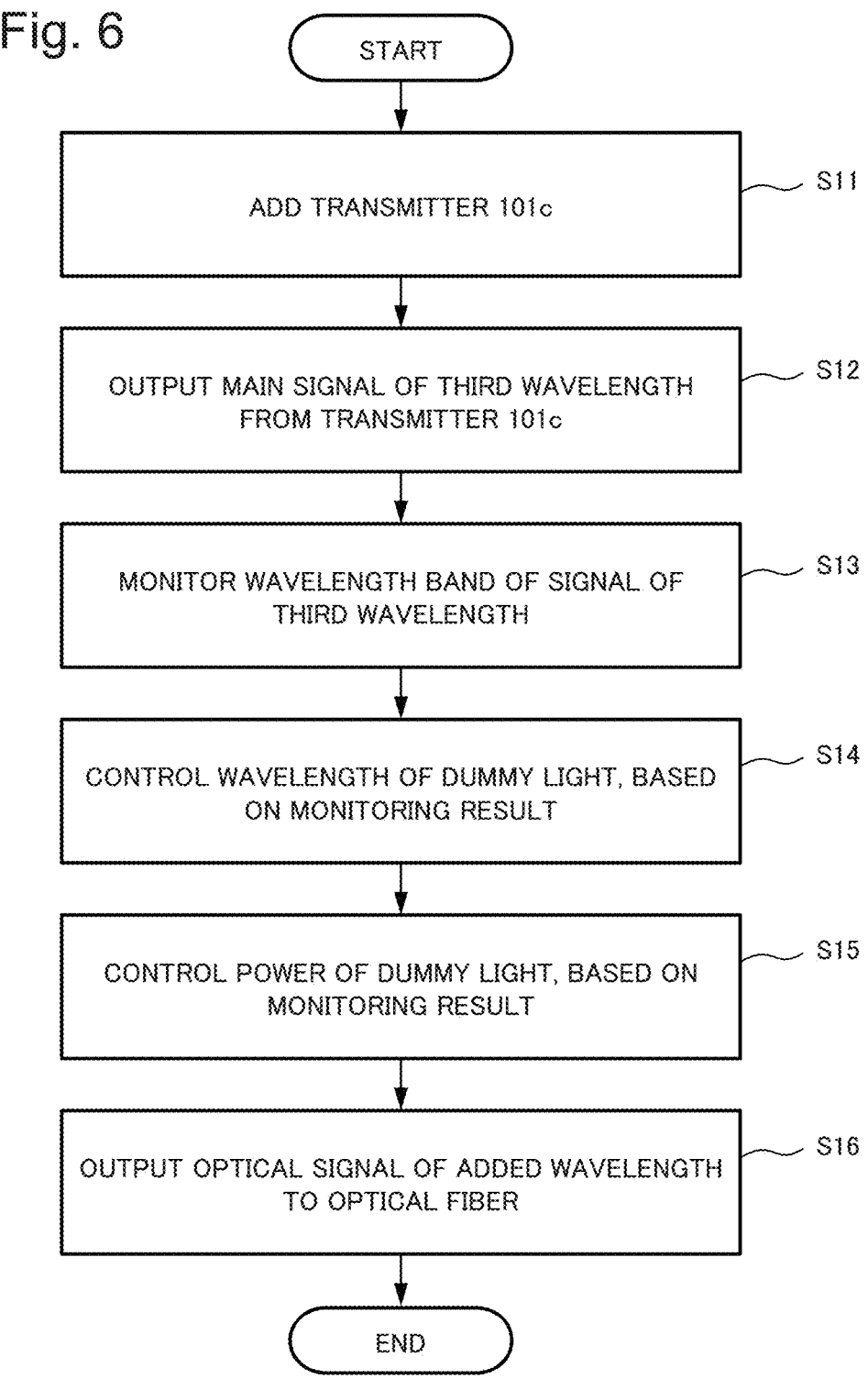
FIG. 6 is a flowchart illustrating an operation of the optical transmission device when a transmitter 101c is added.
Figure 7:
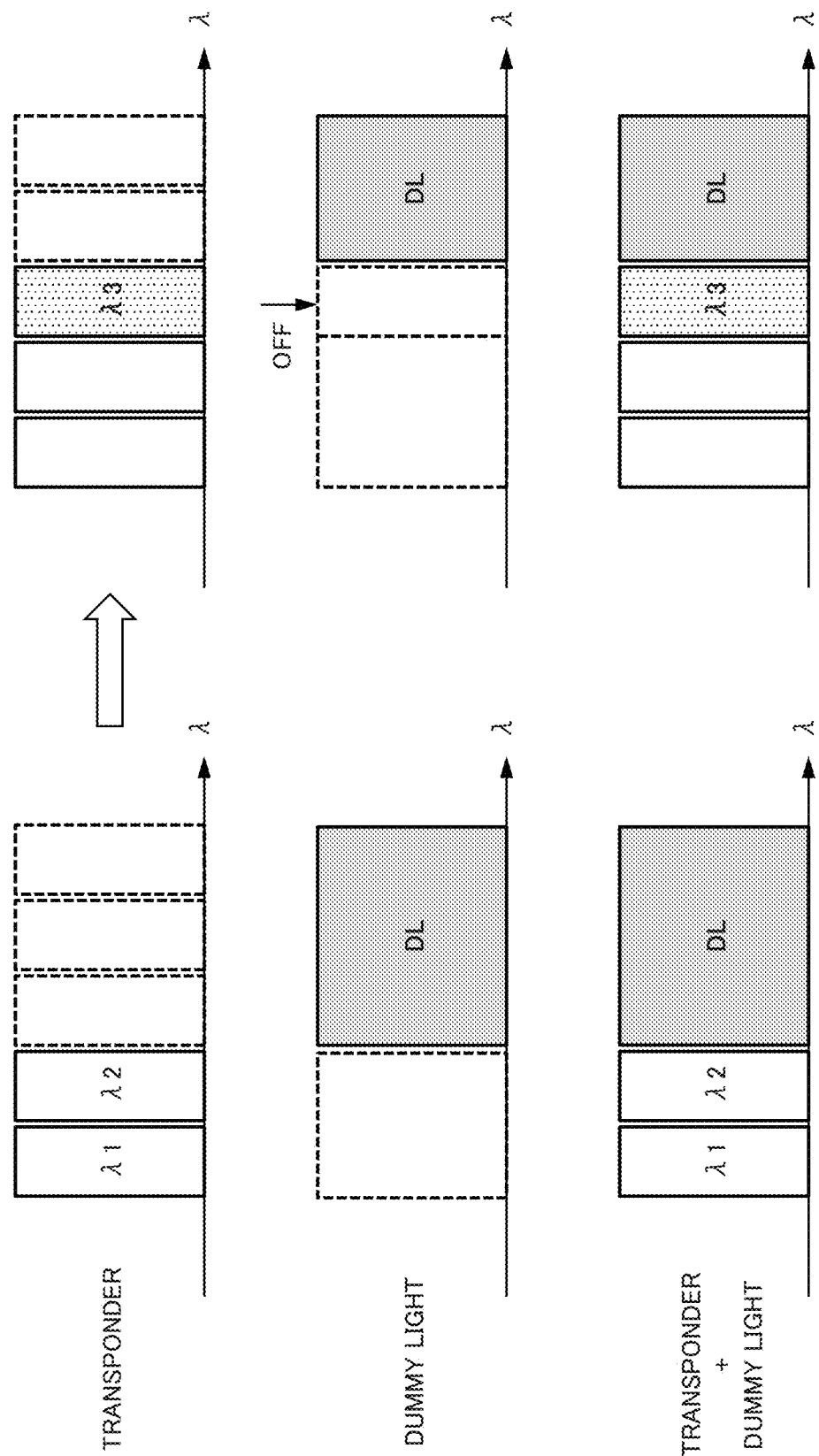
FIG. 7 is a conceptual diagram illustrating ON/OFF control of dummy light when the transmitter 101c is added to the optical transmission device in FIG. 5.

Among the operations of the optical transmission device in FIG. 5, an operation related to wavelength band control of the dummy light, particularly, when the transmitter 101c is added will be described. FIG. 6 is a flowchart illustrating the operation of the optical transmission device when the transmitter 101c is added. FIG. 7 is a conceptual diagram illustrating ON/OFF control of the dummy light when the transmitter 101c is added to the optical transmission device in FIG. 5.

It is assumed that the existing transmitter 101c outputs a signal of a wavelength $\lambda 1$, the existing transmitter 101b outputs a signal of a wavelength $\lambda 2$, and the added transmitter 101c outputs a signal of a wavelength $\lambda 3$.

First, the transmitter 101c is added as illustrated in FIG. 5 (step S11). Then, a main signal having the wavelength $\lambda 3$ is output from the added transmitter 101c (step S12). At this time, in the output branching unit 103 in the multiplexing unit 102, the output of the signal of the wavelength $\lambda 3$ to an optical fiber is blocked, and the signal of the wavelength $\lambda 3$ is output to the OCM 108. Herein, main signals from the existing transmitters 101a and 101b and dummy light may be input to the OCM 108.

Next, the OCM 108 monitors a center wavelength and a wavelength band of the inputted signal of the wavelength $\lambda 3$ (step S13), and notifies the control unit 106 of a monitoring result.

Next, the control unit 106 controls a wavelength of the dummy light, based on the monitoring result from the OCM 108 (step S14). More specifically, the control unit 106 instructs the wavelength band adjustment unit 104 in the multiplexing unit 102 to control the wavelength band of the dummy light. Further, the control unit 106 controls power of the dummy light, based on the monitoring result from the OCM 108 (step S15). Note that the control of the wavelength band of the dummy light and the control of the power of the dummy light, based on the monitoring result, may be performed simultaneously, or the control of the wavelength band of the dummy light may be performed after the control of the power of the dummy light.

Next, the optical signal of the added wavelength is output to the optical fiber (step S16). More specifically, the control unit 106 instructs the output branching unit 103 to output the optical signal of the added wavelength to the optical fiber, in response to the wavelength band adjustment unit 104 controlling the wavelength band of the dummy light.

By such an operation, among the wavelength bands of the dummy light illustrated in FIG. 7, a band overlapping with the band of the wavelength $\lambda 3$ to be output by the added transmitter 101c is set to OFF, and the wavelength $\lambda 3$ is assigned to the added transmitter 101c and output to the optical fiber.

Advantageous Effects

According to the present example embodiment, power control of the dummy light is performed according to the monitoring result from the OCM 108. This enables controlling the wavelength band of the dummy light as well as controlling the power of the dummy light.

Third Example Embodiment

Figure 8:
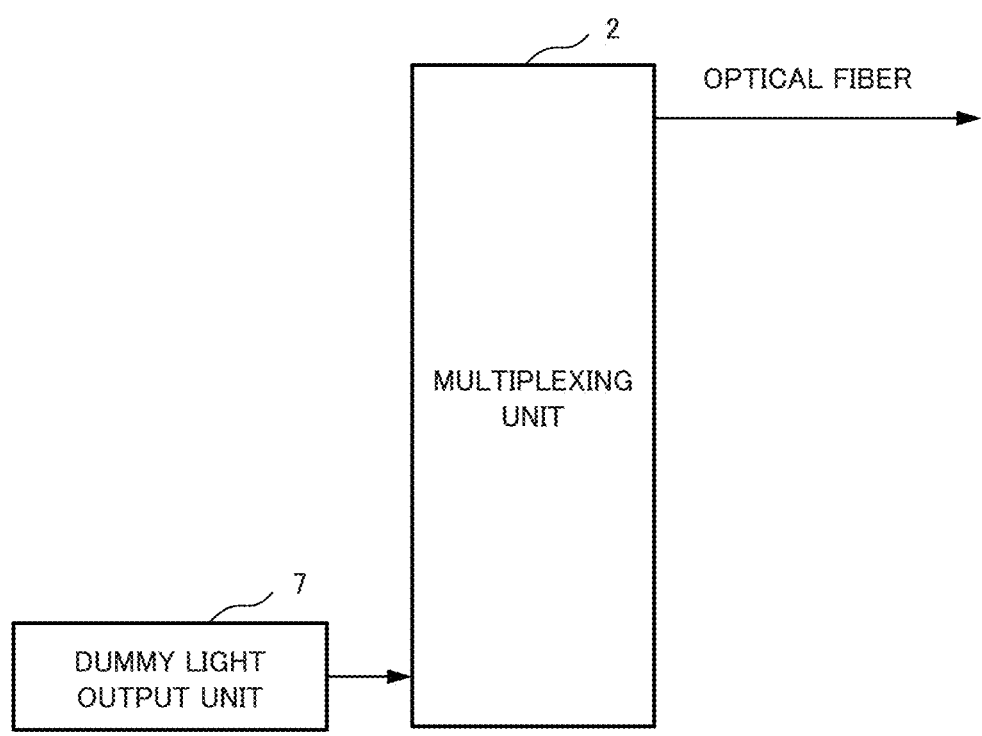
FIG. 8 is a block diagram of an optical transmission device according to a third example embodiment.

FIG. 8 is a block diagram of an optical transmission device according to a third example embodiment. The third example embodiment relates to dark fiber monitoring by using dummy light in a state in which a main signal is not transmitted, such as a state in which a transmitter is not connected to a multiplexing unit 2 as illustrated in FIG. 8.

The optical transmission device in FIG. 8 includes the multiplexing unit 2 and a dummy light output unit 7. The multiplexing unit 2 sends dummy light from the dummy light output unit 7 to an optical fiber. In the optical transmission device according to the present example embodiment, optical fiber monitoring can be performed by continuously sending an optical signal to the optical fiber by using the dummy light from the dummy light output unit 7 in the state without connecting a transmitter and a receiver as illustrated in FIG. 8.

When a transmitter is added to the optical transmission device in FIG. 8 and transmission of the main signal is started, wavelength band control of the dummy light based on monitoring of an added wavelength and a monitoring result is performed as described in the above example embodiments.

Advantageous Effects

The optical transmission device in FIG. 8 performs the dark fiber monitoring by outputting the dummy light. Therefore, the dark fiber monitoring can be performed even when the transmitter that transmits the main signal is not connected to the multiplexing unit. In particular, when the multiplexing unit and the transmitter are manufactured by multivendor, there is an advantage that the dark fiber monitoring can be performed even before connecting the transmitter and starting an operation.

Fourth Example Embodiment

Figure 9A:
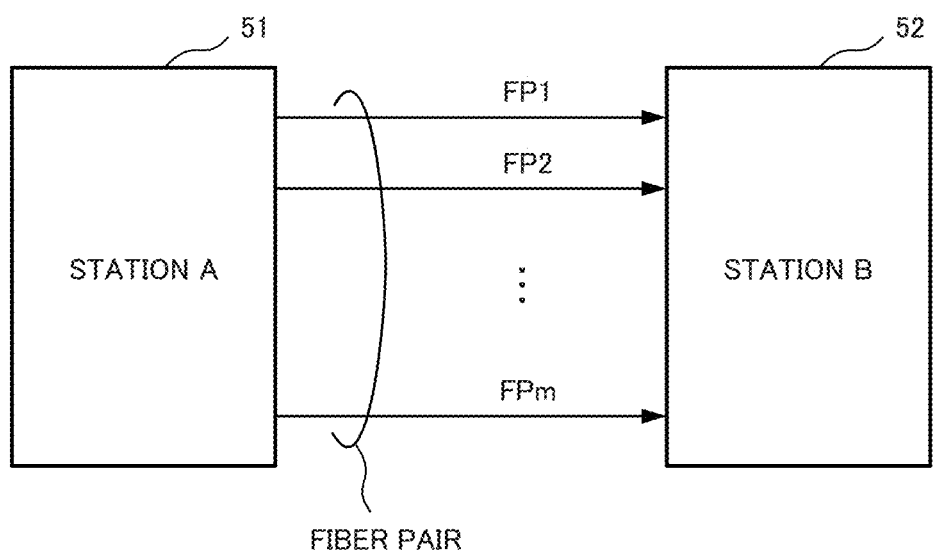
FIG. 9A is a block diagram illustrating one example of a transmission system.
Figure 9B:
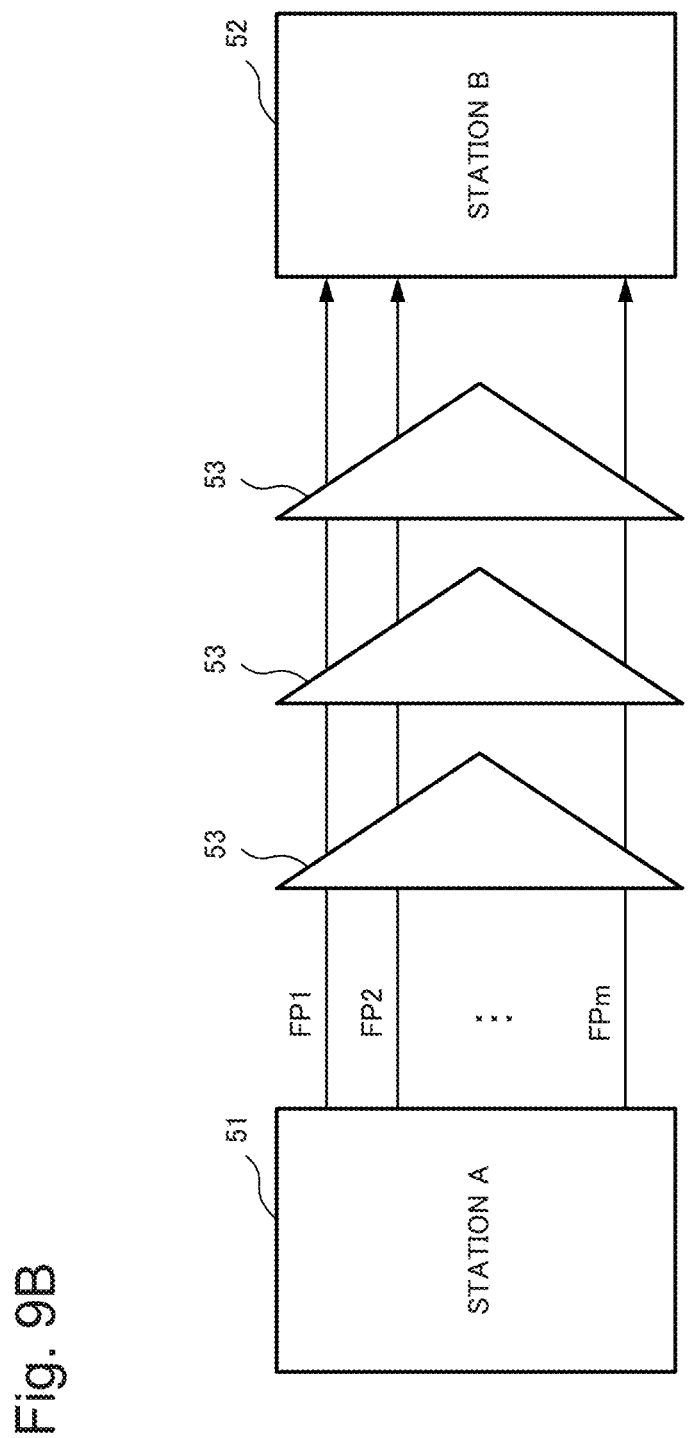
FIG. 9B is a block diagram illustrating another example of the transmission system.

Next, a fourth example embodiment will be described. FIG. 9A is a block diagram illustrating one example of a transmission system. FIG. 9B is a block diagram illustrating another example of the transmission system. A submarine cable system will be described as the transmission system. In the transmission system of FIG. 9A, an optical transmission device 51 (station A) and an optical transmission device 52 (station B) are connected by a laid fiber pair (FP1, FP2, . . . , FPm) of an optical transmission line. As illustrated in FIG. 9B, the transmission system is connected via a repeater 53, particularly a plurality of repeaters 53, inserted in the middle of the fiber pairs (FP1, FP2, . . . , FPm) of the optical transmission line.

In the submarine cable system, all of the laid fiber pairs of the optical transmission line may not be operated from a time of starting, and an operation is started with a minimum configuration. For example, only the fiber pair FP1 of the optical transmission line in FIG. 9A and FIG. 9B is used, and the fiber pair FP2 and later of the optical transmission line are set as dark fibers in many cases.

Figure 10:
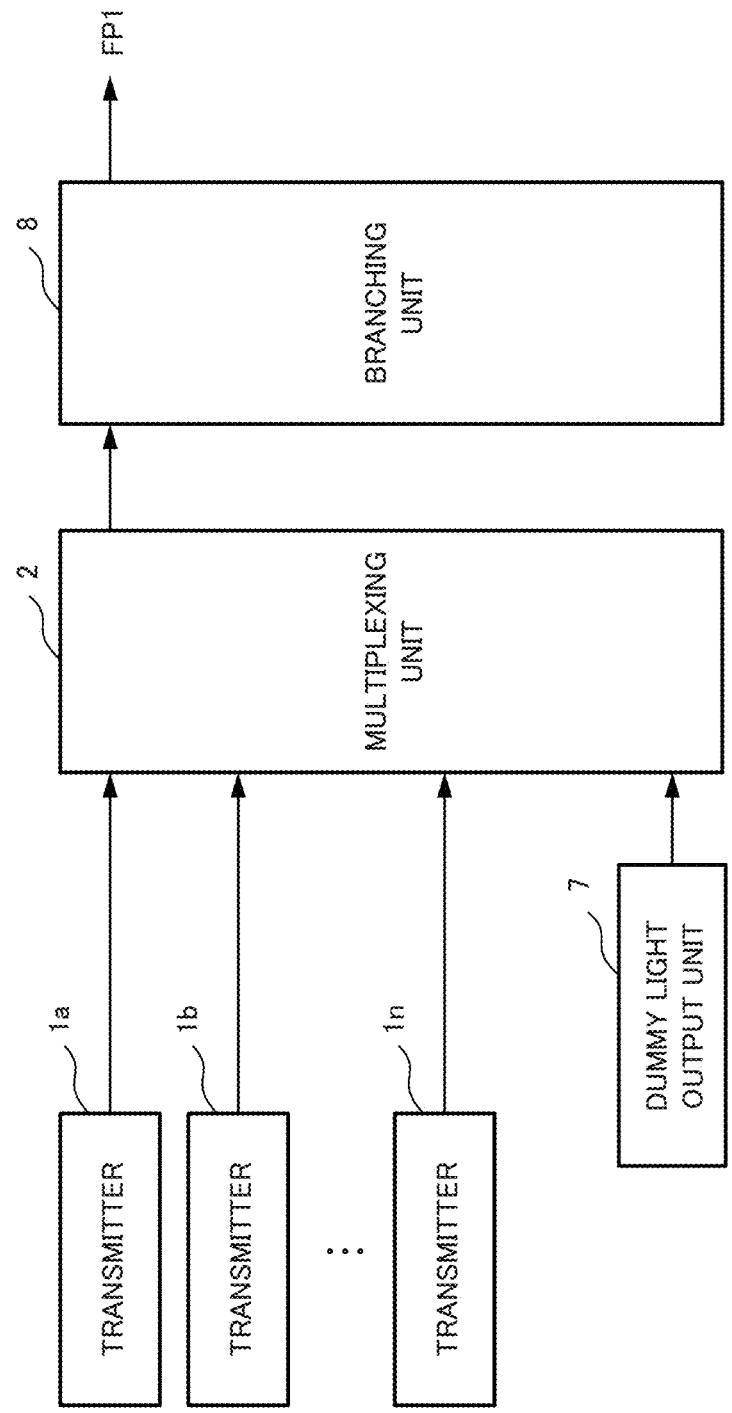
FIG. 10 is a block diagram of an optical transmission device according to a fourth example embodiment.
Figure 11A:
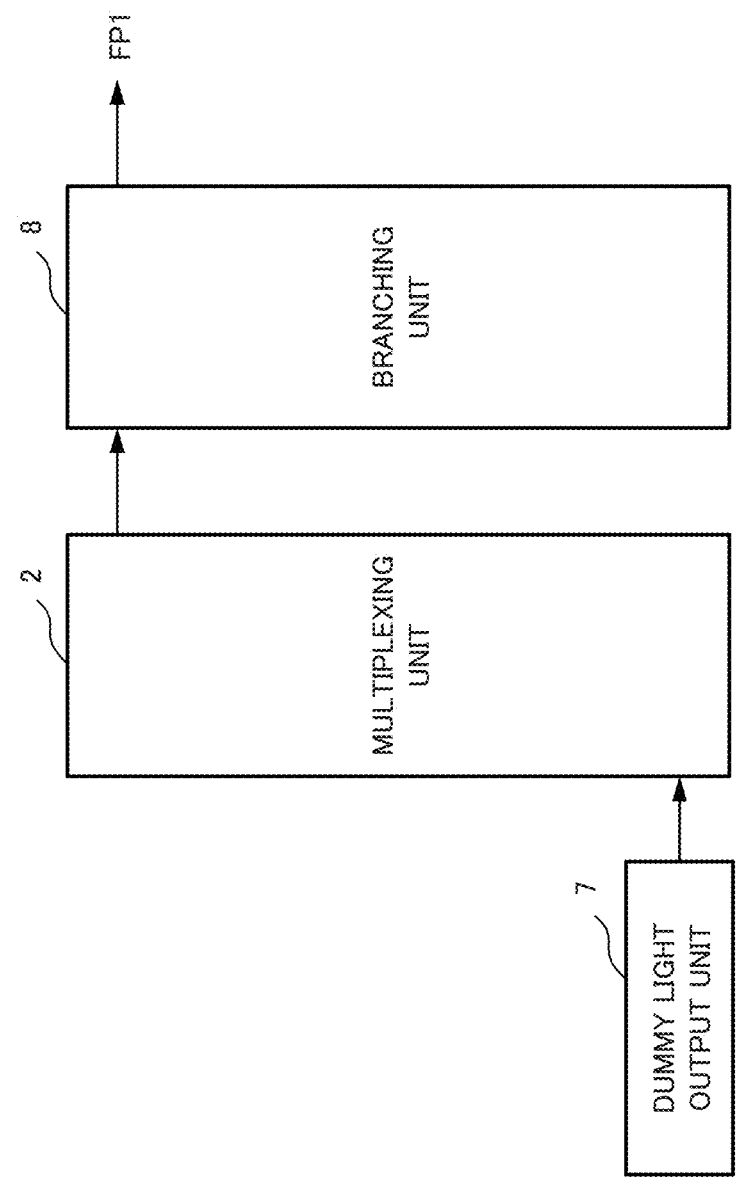
FIG. 11A is a block diagram of the optical transmission device according to the fourth example embodiment in a state where only dummy light is being transmitted.
Figure 12:
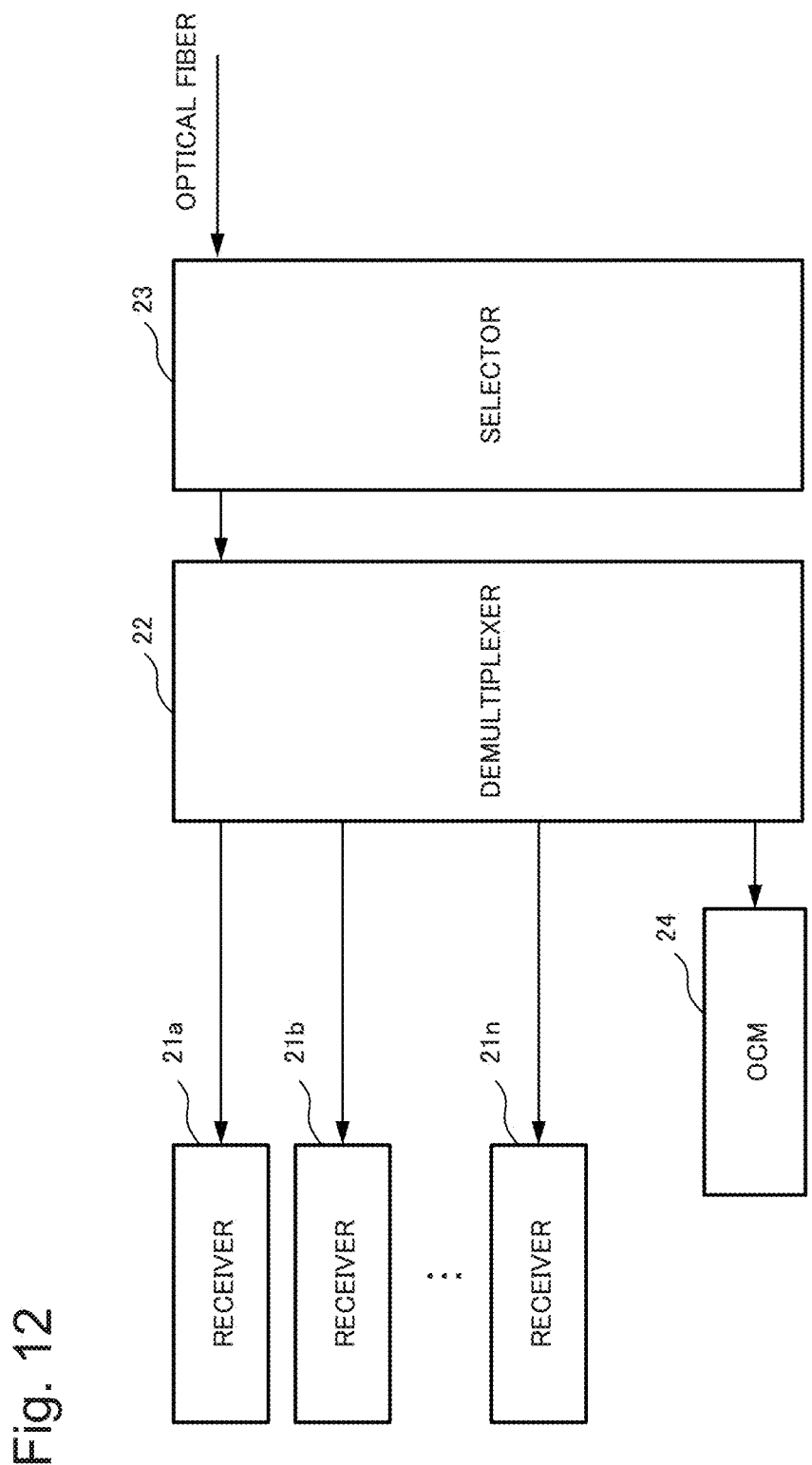
FIG. 12 is a block diagram of a reception-side transmission device of the optical transmission device according to the fourth example embodiment.
Figure 13:
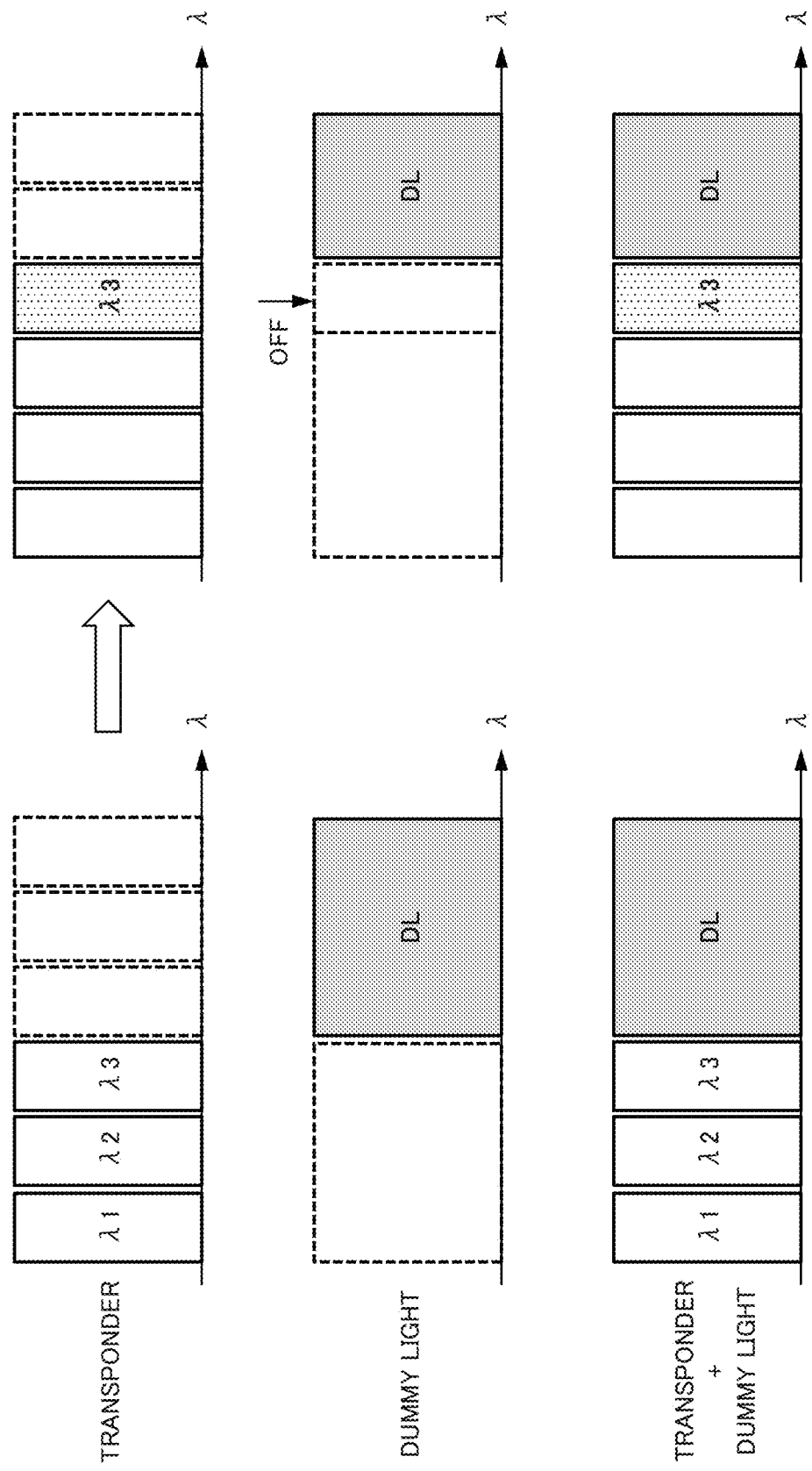
FIG. 13 is a conceptual diagram illustrating ON/OFF control of the dummy light.
Figure 14:
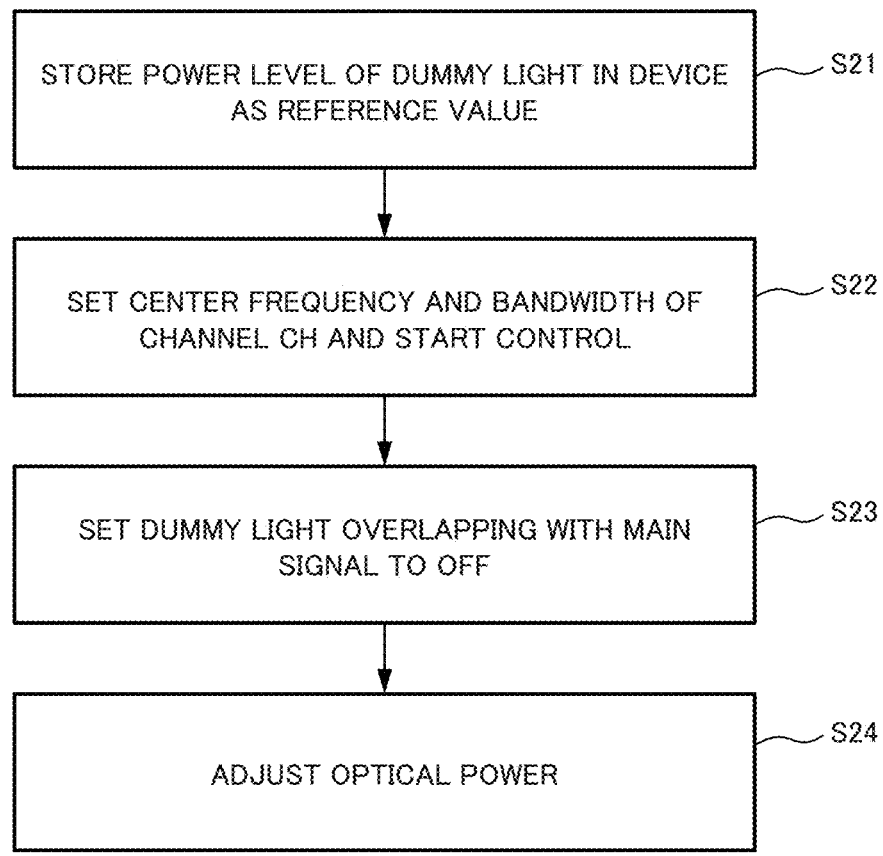

FIG. 10 is a block diagram of a transmission-side transmission device of the optical transmission device according to the fourth example embodiment. FIG. 11A is a block diagram of the optical transmission device according to the fourth example embodiment in a state where only dummy light is being transmitted. FIG. 11B is a block diagram of the optical transmission device according to the fourth example embodiment that illustrates a redundant configuration in the state where only the dummy light is being transmitted. FIG. 12 is a block diagram of a reception-side transmission device of the optical transmission device according to the fourth example embodiment. FIG. 13 is a conceptual diagram illustrating ON/OFF control of the dummy light. FIG. 14 is a flowchart illustrating the ON/OFF control of the dummy light and the like.

The transmission-side transmission device of the optical transmission device in FIG. 10 includes a plurality of transmitters 1a, 1b, . . . , 1n, a multiplexing unit 2 (multiplexer (MUX)), a dummy light output unit 7, and a branching unit 8. The multiplexing unit 2 multiplexes main signals of the plurality of transmitters 1a, 1b, . . . , 1n and the dummy light from the dummy light output unit 7, and sends the multiplexed main signals and the dummy light from the branching unit 8 to a fiber pair FP1 of the optical transmission line. The branching unit 8 may be achieved by a combination of an optical coupler and an optical switch.

In the transmission-side transmission device of the optical transmission device according to the present example embodiment, optical fiber monitoring can be performed by continuously sending an optical signal to the fiber pair FP1 of the optical transmission line by using the dummy light from the dummy light output unit 7 in a state without connecting the transmitter and a receiver as illustrated in FIG. 11A. The transmission-side transmission device of the optical transmission device in FIG. 11A includes the multiplexing unit 2, the dummy light output unit 7, and the branching unit 8.

The transmission-side transmission device of the optical transmission device according to the present example embodiment can be a redundant configuration in which only the dummy light is being transmitted as illustrated in FIG. 11B. In other words, optical fiber monitoring can be performed by continuously sending an optical signal to the fiber pairs FP1 and FP2 of the optical transmission line by using the dummy light from the dummy light output unit 7 in a state without connecting the transmitter and the receiver as illustrated in FIG. 11B. The transmission-side transmission device of the optical transmission device in FIG. 11B includes the multiplexing unit 2, the dummy light output unit 7, and the branching unit 8. The branching unit 8 branches and sends the signal to the fiber pairs FP1 and FP2 of the optical transmission line, and sends the same dummy light signal to fiber pairs FP1 and FP2 of the optical transmission line. The branching unit 8 in FIGS. 11A and 11B may be achieved by a combination of an optical coupler and an optical switch.

In the optical transmission device according to the present example embodiment, the dummy light and the like sent to the fiber pair of the optical transmission line by the transmission-side transmission device can be monitored by the reception-side transmission device. The reception-side transmission device of the optical transmission device in FIG. 12 includes a plurality of receivers 21a, 21b, . . . , 21n, a demultiplexer (DMUX) 22, a selector (SEL) 23, and an optical channel monitor (OCM) 24. In the reception-side transmission device of the optical transmission device in FIG. 12, the optical signal received from fiber pair FP1 of the optical transmission line is selected by the selector 23, the selected optical signal is wavelength-demultiplexed by the demultiplexer 22, and the wavelength-demultiplexed optical signals are sent to a plurality of receivers 21a, 21b, . . . , 21n. Further, in the OCM 24, it is possible to monitor the transmission line quality of the fiber pair FP1 of the optical transmission line.

Next, ON/OFF automatic control of the dummy light will be described. It is assumed that a transmitter is connected to the device configuration that sends only the dummy light to the optical fiber illustrated in FIG. 11A. When a signal from the transmitter is input to a fiber band and an operation is started, light intensity and a wavelength are automatically determined and the dummy light is set to OFF appropriately. Similarly, when the transmitter is removed, the dummy light is set to ON. It is assumed that the transmitter to be connected to the transmission-side transmission device is a device capable of pre-emphasis control in such a way as to perform operation even when a signal with various wavelength bands is input.

As illustrated in the conceptual diagram of FIG. 13, it is assumed that grids are arranged from a short wave side to a long wave side with a fine grid width in such a way that the bandwidth can be set freely. When the transmitter is not connected to the transmission-side transmission device as illustrated in FIG. 11A and FIG. 11B, the dummy light DL is set to ON and sent to the optical-transmission-line side.

When the transmitter is connected to the transmission-side transmission device, for example, a plurality of transponders as a plurality of existing transmitters output a signal of a wavelength $\lambda 1$, a signal of a wavelength $\lambda 2$ on a longer wave side than the wavelength $\lambda 1$, a signal of a wavelength $\lambda 3$ on a longer wave side than the wavelength $\lambda 2$, and a signal of a wavelength $\lambda 4$ from an added transmitter. When the transmitter is connected to the transmission-side transmission device, a center wavelength and a bandwidth of the signal are detected in the OCM 108 of the transmission-side transmission device in FIG. 5 or in the OCM 24 of the reception-side transmission device in FIG. 12, and dummy light at an associated portion is set to OFF as the diagram illustrated in the middle of FIG. 13. At this time, while the dummy light becomes OFF and the signal from the transmission-side transmission device passes, the dummy light is set to an adjustable light level in advance in such a way that an optical signal to noise ratio (OSNR) characteristic can be sufficiently secured.

Next, a sequence of an automatic adjustment function will be described with reference to FIG. 14. A power level of the dummy light is set as a reference value in advance by using the OCM 5 or the OCM 24, and the reference value is stored in the transmission-side transmission device or the reception-side transmission device (step S21). Next, a center frequency and a bandwidth of a channel CH by the transmitter to be added to the transmission-side transmission device are set from a control terminal, and control is started (step S22). Next, the dummy light overlapping with a main signal of the set wavelength is set to OFF (step S23). Setting the dummy light to OFF is automatically performed.

While the optical power of the wavelength by the added transmitter is monitored by the OCM 108 or the OCM 24, the optical power is adjusted by the multiplexing unit 2 in FIG. 10 or the demultiplexer 22 in FIG. 12 in such a way as to approach the reference value of the dummy light (step S24). When there are a plurality of wavelengths to be added, a next added channel CH being set is adjusted. In this way, the control sequence is completed. It can be configured that, when fine adjustment is required after the completion of the control sequence, the adjustment can be performed manually from the control terminal.

Other Example Embodiment

Figure 15:
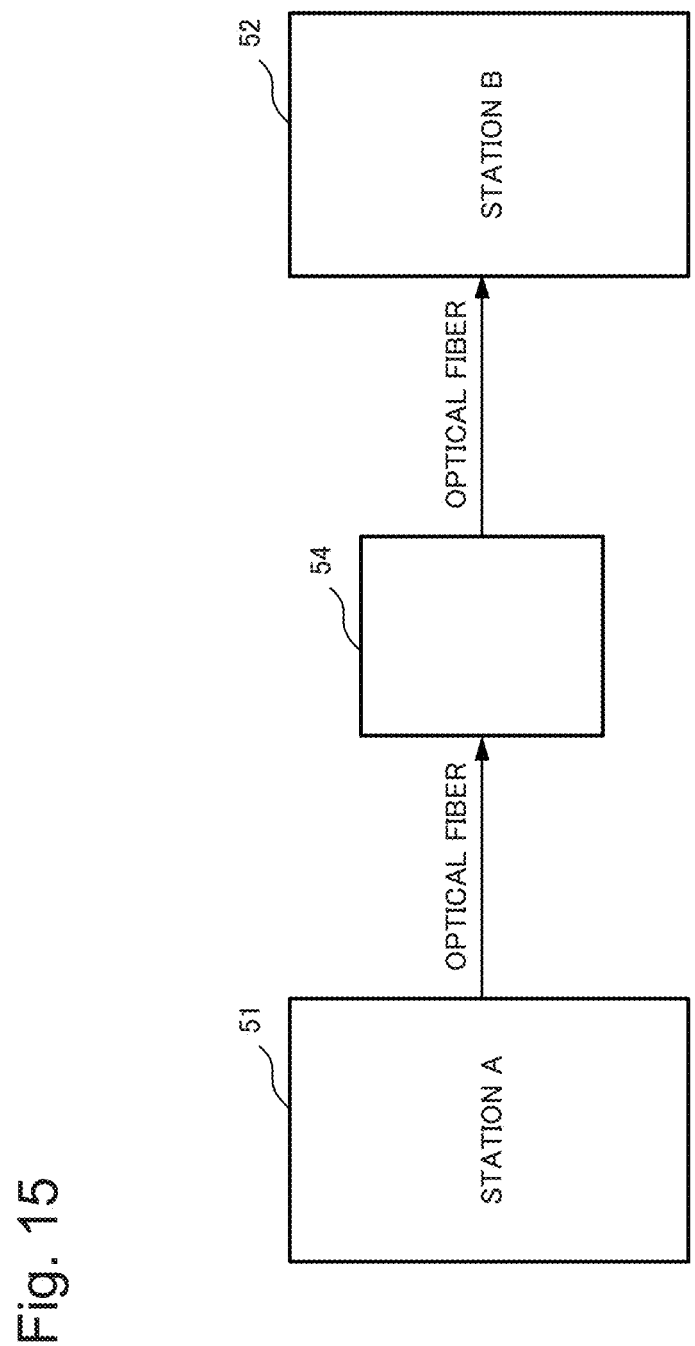
FIG. 15 is a block diagram of a transmission system according to other example embodiments.

The preferred example embodiments have been described above, however the present invention is not limited to these example embodiments, and various changes and expansions are possible. For example, an add/drop ratio in a submarine reconfigurable optical add-drop multiplexer (ROADM) device may be changed according to wavelength band control of dummy light. In a transmission system of FIG. 15, a submarine ROADM device 54 is provided on a transmission line connecting an optical transmission device 51 (station A) and an optical transmission device 52 (station B). In such a transmission system, an add/drop ratio in the submarine ROADM device 54 may be changed according to wavelength band control of dummy light. At this time, a transmission device transmits a control signal to the submarine ROADM device according to the wavelength band control of the dummy light.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-14326, filed on Jan. 31, 2018, the disclosure of which is incorporated herein in its entirety by reference.

REFERENCE SIGNS LIST

101*a*, 101*b*, 101*c*, 1*a*, 1*b*, 1*c*, 1*n* Transmitter
102 Multiplexing unit
103 Output branching unit
104 Wavelength band adjustment unit
105 Signal detection unit
106 Control unit
107, 7 Dummy light output unit
108, 24 OCM
8 Branching unit
21*a*, 21*b*, 21*n* Receiver
22 Demultiplexer
23 Selector
51, 52 Optical transmission device
53 Repeater
54 Submarine ROADM device

The invention claimed is:

1. An optical transmission device comprising:
   an output branching unit that multiplexes an added main signal and dummy light and outputs the multiplexed signal to an optical transmission line;
   a wavelength adjustment unit that adjusts a wavelength band of the dummy light;
   a signal detection unit that inputs an optical signal to be output by the output branching unit, detects a wavelength band of an added main signal, and outputs a detection result; and
   a control unit that controls the wavelength adjustment unit according to a detection result of the signal detection unit, wherein
   the output branching unit selects the wavelength band of the added main signal, outputs a signal of the selected wavelength band to the signal detection unit, and outputs the signal of the selected wavelength band to the optical transmission line in response to the wavelength adjustment unit controlling the wavelength band of the dummy light.

2. The optical transmission device according to claim 1, wherein
   the signal detection unit monitors a center wavelength and the wavelength band of the added main signal, and outputs the detection result.

3. The optical transmission device according to claim 1, wherein
   the control unit instructs the wavelength adjustment unit to control the wavelength band of the dummy light according to the detection result of the signal detection unit.

4. The optical transmission device according to claim 3, wherein
   the control unit instructs the wavelength adjustment unit to control the wavelength band of the dummy light, and also instructs the output branching unit to change an output state.

5. The optical transmission device according to claim 3, wherein
   power of dummy light to be output by the output branching unit is controlled according to the detection result of the signal detection unit.

6. A transmission system including an optical transmission device connected via an optical fiber, the transmission system comprising
   the optical transmission device according to claim 1.

7. A control method for a transmission system to which an optical transmission device is connected via an optical fiber, the control method comprising:
   multiplexing a main signal from a transmitter and dummy light to be input, and outputting the multiplexed signal to an optical transmission line;
   measuring optical signal intensity of each wavelength of a multiplexed output of a main signal from the transmitter and dummy light to be input, and outputting a detection result; and
   adjusting a wavelength band of a signal of the multiplexed output according to the detection result, wherein
   the wavelength band of the added main signal is selected, and a signal of the selected wavelength band is output, and wherein the signal of the selected wavelength band is output to the optical transmission line in response to control the wavelength band of the dummy light.

8. The control method for the transmission system according to claim 7, wherein
   a center wavelength and a wavelength band of a signal to be input from the transmitter is monitored, and the detection result is output.

9. The control method for the transmission system according to claim 7, wherein
   the wavelength band of the dummy light is controlled according to the detection result.

10. The control method for the transmission system according to claim 7, wherein
power of the dummy light is controlled according to the detection result.

* * * * *